(12) United States Patent
Heo et al.

(10) Patent No.: US 12,007,770 B2
(45) Date of Patent: Jun. 11, 2024

(54) CONTROL METHOD OF AIR VEHICLE FOR URBAN AIR MOBILITY

(71) Applicants: Hyundai Motor Company, Seoul (KR); Kia Corporation, Seoul (KR)

(72) Inventors: Jin Hyuck Heo, Seoul (KR); Min Woo Han, Gyeonggi-do (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 337 days.

(21) Appl. No.: 17/506,289

(22) Filed: Oct. 20, 2021

(65) Prior Publication Data
US 2022/0326710 A1    Oct. 13, 2022

(30) Foreign Application Priority Data

Apr. 12, 2021   (KR) ........................ 10-2021-0046858

(51) Int. Cl.
| | |
|---|---|
| *G05D 1/02* | (2020.01) |
| *B64C 13/12* | (2006.01) |
| *B64C 27/08* | (2023.01) |
| *G05D 1/00* | (2006.01) |
| *B64C 13/04* | (2006.01) |

(52) U.S. Cl.
CPC ........... *G05D 1/0202* (2013.01); *B64C 13/12* (2013.01); *B64C 27/08* (2013.01); *G05D 1/0061* (2013.01); *G05D 1/102* (2013.01); *B64C 13/042* (2018.01); *B64C 13/044* (2018.01)

(58) Field of Classification Search
CPC .. G05D 1/1011; G05D 1/0088; G05D 1/0061; G05D 1/0202; G05D 1/102; B64C 1/02; B64C 27/08; B64C 13/042; B64C 13/044; B64C 13/12
USPC ............................................................ 701/3
See application file for complete search history.

(56) References Cited

U.S. PATENT DOCUMENTS

| | | | | |
|---|---|---|---|---|
| 5,823,468 | A * | 10/1998 | Bothe ....................... | B64B 1/34 244/209 |
| 9,607,521 | B2 * | 3/2017 | Coulmeau ............ | G08G 5/0021 |
| 10,223,921 | B2 * | 3/2019 | Navarro Felix ..... | G08G 5/0039 |
| 11,117,657 | B2 * | 9/2021 | Burns ................... | B64C 27/605 |
| 11,490,056 | B2 * | 11/2022 | Sato ...................... | G05D 1/0088 |
| 11,640,178 | B2 * | 5/2023 | Nonami ................. | B64U 50/19 701/3 |
| 11,649,061 | B2 * | 5/2023 | Oldroyd .................. | B64C 39/08 244/7 B |
| 11,667,381 | B2 * | 6/2023 | Shimezawa .......... | H04B 7/0617 701/3 |
| 11,689,699 | B2 * | 6/2023 | Tazume ................. | B64U 30/20 701/11 |

(Continued)

*Primary Examiner* — Andrew Joseph Rudy
(74) *Attorney, Agent, or Firm* — Fox Rothschild LLP

(57) ABSTRACT

A control method of an air vehicle for urban air mobility (UAM) is provided. The method enable people to more easily control an air vehicle for UAM, and moves in a flight manner familiar to people during flight to allow a driver and passengers comfortably use the air vehicle without discomfort such as motion sickness, dizziness, etc. The control method includes acquiring air vehicle driving information; adjusting an altitude of the air vehicle to a target altitude; adjusting longitudinal acceleration and longitudinal deceleration of the air vehicle; and operating steering during flight of the air vehicle.

10 Claims, 13 Drawing Sheets

(56) References Cited

U.S. PATENT DOCUMENTS

| | | | |
|---|---|---|---|
| 11,755,035 B2* | 9/2023 | Koyanagi | B64U 10/13 |
| | | | 701/4 |
| 2012/0234968 A1* | 9/2012 | Smith | B64C 29/0033 |
| | | | 244/12.3 |
| 2015/0175258 A1* | 6/2015 | Lee | B64C 27/14 |
| | | | 244/17.23 |
| 2017/0061804 A1* | 3/2017 | Navarro Felix | G05D 1/0088 |
| 2018/0293814 A1* | 10/2018 | Gilbert | F02D 41/1406 |
| 2019/0144116 A1* | 5/2019 | Yuan | B64C 27/08 |
| | | | 701/3 |
| 2022/0026397 A1* | 1/2022 | Kamel | G01N 29/043 |
| 2022/0324550 A1* | 10/2022 | Heo | B64C 13/503 |

* cited by examiner

CONTROL METHOD OF AIR VEHICLE FOR URBAN AIR MOBILITY

CROSS REFERENCE TO RELATED APPLICATION

The present application claims priority to Korean Patent Application No. 10-2021-0046858, filed Apr. 12, 2021, the entire contents of which is incorporated herein for all purposes by this reference.

BACKGROUND

Field of the Disclosure

The present disclosure relates generally to a control method of an air vehicle for urban air mobility (UAM) and, more particularly, to a control method capable of enabling people to more easily control an air vehicle for UAM, and of moving the air vehicle in a flight manner familiar to people during flight allowing a driver and passengers to comfortably use the air vehicle without discomfort such as motion sickness, dizziness, etc.

Description of the Related Art

Recently, the urban air mobility (UAM) for future transportation system is being researched and developed. The research and development components for UAM include a vertical take-off and landing (VTOL) air vehicle, the VTOL air vehicle being improved degree of freedom in flight and capable of taking off and landing in a narrow space. With the recent development of electrification technology, interest in a drone-type vertical take-off and landing air vehicle having multiple rotors has been increased. As an example, a quadcopter having 4 rotors is known as the drone-type vertical take-off and landing air vehicle, and the quadcopter may be used as an air vehicle for UAM.

FIG. 1 is a view showing the quadcopter that is an electric drone-type vertical take-off and landing air vehicle, and FIG. 2 is a schematic view showing an example of a conventional human-machine interface (HMI) for controlling the quadcopter according to the prior art. As shown in FIG. 1, the electric drone 1 such as the quadcopter, etc. is capable of yaw, roll, and pitch movement. A s shown in FIG. 2, the drone may move forward/backward, left/right, and up/down, or rotate left/right in response to a direction of controlling a lever 2 of a controller.

As described above, the electric drone may perform forward and backward, and transverse movement by adjusting rotation velocity and direction of the rotors, and a driver can make a desired motion by combining complex form of control input as shown in FIG. 2. However, the controller or the driving input device as shown in FIG. 2 has an advantage that 6-way flight freedom, such as forward/backward, left/right, up/down (ascending/descending), yaw, pitch, roll can be utilized to the fullest, but it is difficult for people to operate the air vehicle since the driver is required to use the complex and unfamiliar driving input device to control the air vehicle.

Accordingly, to create a desired motion of the drone by various control input combination, a professional education and training such as airplane control may be essential. In addition, the drone is capable of pure transverse movement, unlike movement characteristics of existing ground mobility, so the electric drone has characteristics of capable of yaw movement and decoupling of transverse movement.

The above described characteristics may significantly increase the movement freedom of the drone, but in drones with passengers, the driver and passengers can feel discomfort such as motion sickness, dizziness, etc. Moreover, when boarding the drone, due to the movement characteristics, it is possible to perform air vehicle movement that is unfamiliar to the driver or passengers, e.g., movement without difference between forward/backward/left/right, so the driver and passengers can feel more uncomfortable. Accordingly, there is a need for a HMI device and control algorithm for controlling a drone, which are capable of overcoming the limitation in movement control of the existing electric drone and of providing familiar movement characteristics to the driver and passengers.

SUMMARY

Accordingly, the present disclosure has been made keeping in mind the above problems occurring in the related art, and the present disclosure is intended to propose a control method of an air vehicle for UAM, the control method being capable of allowing people to more easily control the air vehicle for UAM and of providing an airframe movement characteristic familiar to people to enable a driver and passengers to comfortably use the air vehicle without discomfort such as motion sickness, dizziness, etc.

The present disclosure is not limited to the objective mentioned above, and other objectives not mentioned are clearly understood by those who are ordinarily skilled in the art to which the present disclosure belongs (hereinbelow, referred to 'those skilled in the art') from the following description.

In order to achieve the above objective, according to one aspect of the present invention, a control method of an air vehicle for urban air mobility is provided. The air vehicle may include a driving input device having a steering wheel, an accelerator pedal, a decelerator pedal, and an altitude designating device. The control method may include: acquiring, by a controller, air vehicle driving information including driving input information in response to operation of the driving input device; adjusting by the controller, an altitude of the air vehicle to a target altitude based on a target altitude value in response to an operation state of the altitude designating device among the acquired air vehicle driving information; adjusting, by the controller, longitudinal acceleration and longitudinal deceleration of the air vehicle in response to operation states of the accelerator pedal and the decelerator pedal among the acquired air vehicle driving information; and adjusting, by the controller, steering during flight of the air vehicle in response to an operation state of the steering wheel among the acquired air vehicle driving information.

According to the present disclosure, with the control method of the air vehicle for UAM, the vertical take-off and landing process is automated and the steering wheel, and the accelerator pedal and decelerator pedal of a conventional automobile that are familiar to a driver are applied to a control system in which the control method is applied, thus allowing the driver to control the air vehicle with the same method and principle as driving a conventional automobile and people may more easily control the air vehicle that has previously been driven by only highly trained specialized experts.

During the control, the air vehicle response similar to response of a conventional automobile can be expected, so that a driver who is an existing vehicle driver may operate the air vehicle without a high level of training, and a driver's license test for the air vehicle may be conducted by adding a process (altitude, etc.) to the existing driver's license test. The air vehicle may move by the movement method familiar to the driver and passengers, and people may use the air vehicle without discomfort, such as motion sickness, dizziness, etc., during flight of the air vehicle.

BRIEF DESCRIPTION OF THE DRAWINGS

The above and other objectives, features, and other advantages of the present invention will be more clearly understood from the following detailed description when taken in conjunction with the accompanying drawings, in which.

DETAILED DESCRIPTION

Figure 1:
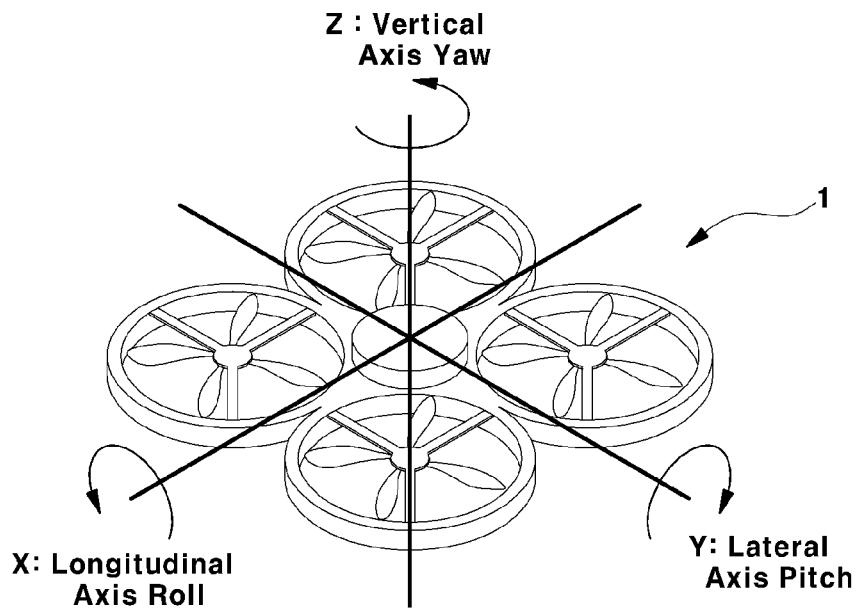
FIG. 1 is a view showing a quadcopter that is an electric drone-type vertical take-off and landing air vehicle according to the prior art.

In the following description, the structural or functional description specified to an exemplary embodiment according to the concept of the present invention is intended to describe the exemplary embodiment, and an embodiment described herein may be changed in various ways and various shapes. However, it should be understood that exemplary embodiments according to the concept of the present invention are not limited to the embodiment which will be described hereinbelow with reference to the accompanying drawings, but all of modifications, equivalents, and substitutions are included in the scope and spirit of the invention.

It will be understood that although the terms first and/or second, etc. may be used herein to describe various elements, these elements should not be limited by these terms. These terms are only used to distinguish one element from another element. For instance, a first element discussed below could be termed a second element without departing from the teachings of the present invention. Similarly, the second element could also be termed the first element.

It is to be understood that when one element is referred to as being "connected to" or "coupled to" another element, it may be connected directly to or coupled directly to another element or be connected to or coupled to another element, having the other element intervening therebetween. On the other hand, it is to be understood that when one element is referred to as being "connected directly to" or "coupled directly to" another element, it may be connected to or coupled to another element without the other element intervening therebetween. Further, the terms used herein to describe a relationship between elements, that is, "between", "directly between", "adjacent", or "directly adjacent" should be interpreted in the same manner as those described above.

Like reference numerals are used to identify like components throughout different drawings. The terminology used herein is for the purpose of describing a particular embodiment only and is not intended to limit the present invention. Singular forms are intended to include plural forms unless the context clearly indicates otherwise. It will be further understood that the terms "comprises" or "have" used in this specification, specify the presence of stated features, steps, operations, components, parts, or a combination thereof, but do not preclude the presence or addition of one or more other features, numerals, steps, operations, components, parts, or a combination thereof.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor and is specifically programmed to execute the processes described herein. The memory is configured to store the modules and the processor is specifically configured to execute said modules to perform one or more processes which are described further below.

Furthermore, control logic of the present disclosure may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

Hereinbelow, an embodiment of the present disclosure will be described in detail with reference to the accompanying drawings.

The present disclosure is intended to provide a control method of an air vehicle, the control method being capable of enabling people to more easily control an air vehicle and of enabling the air vehicle to move in a movement manner familiar to people thus allowing a driver and passengers to comfortably use the air vehicle without discomfort such as motion sickness, dizziness, etc.

The present disclosure may be applied to the air vehicle for urban air mobility (hereinbelow, which is referred to UAM), in detail, the vertical take-off and landing air vehicle capable of moving and flying in a desired direction, velocity, and posture at a desired altitude through a driving control by a driver seated in the air vehicle. More particularly, the present disclosure may be applied to the electric drone-type air vehicle having multiple rotors, and as an example thereof, the present disclosure may be applied to the quadcopter having 4 rotors.

Prior to the description of the embodiment of the present disclosure, a flight principle of the drone-type vertical take-off and landing air vehicle having multiple rotors will be described as follows with reference to FIGS. 3 to 7. FIGS. 3 to 7 show an example of the quadcopter. The 4 rotors mounted to the vertical take-off and landing air vehicle 1 may include a first rotor 10 and a second rotor 20 arranged at the front left and right of the air vehicle, and a third rotor 30 and a fourth rotor 40 arranged at the rear left and right of the air vehicle. The first rotor 10 and the fourth rotor 40 may be arranged diagonally to each other and the second rotor 20 and the third rotor 30 may be arranged diagonally to each other.

Figure 3:
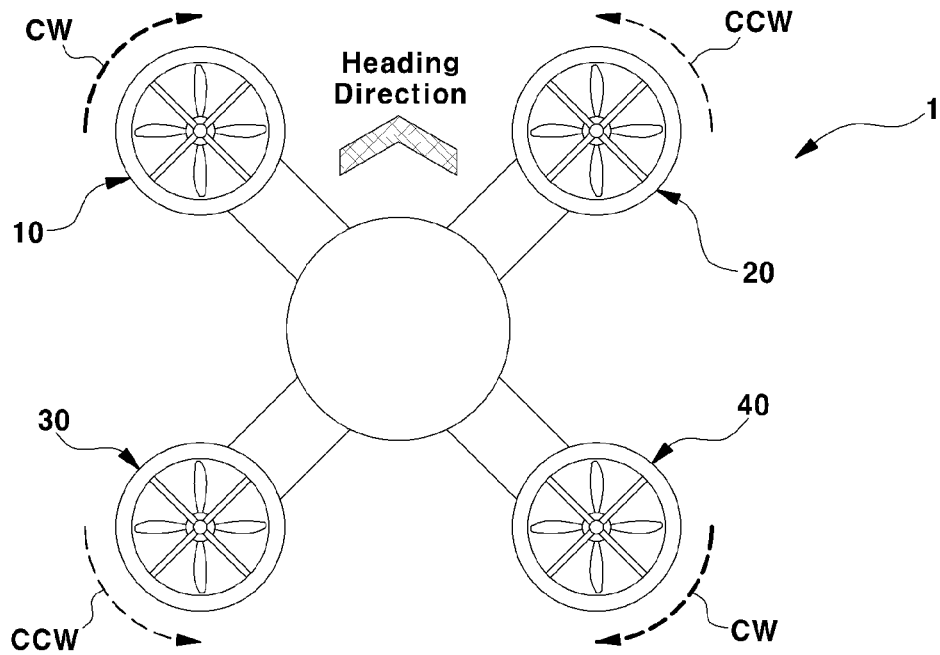
FIGS. 3 to 7 are views showing a flight principle of a drone-type vertical take-off and landing air vehicle having multiple rotors.

Referring to FIG. 3, for take-off and landing, and flight of the vertical take-off and landing air vehicle 1, fundamentally, the first rotor 10 and the fourth rotor 40 rotate clockwise (CW), and the second rotor 20 and the third rotor 30 rotate counterclockwise (CCW). At this point, as a rotational velocity and a direction are controlled, movement of the vertical take-off and landing air vehicle, such as ascending and descending, forward and backward movements, transverse movement, left and right rotations, etc., may be performed.

Figure 4:
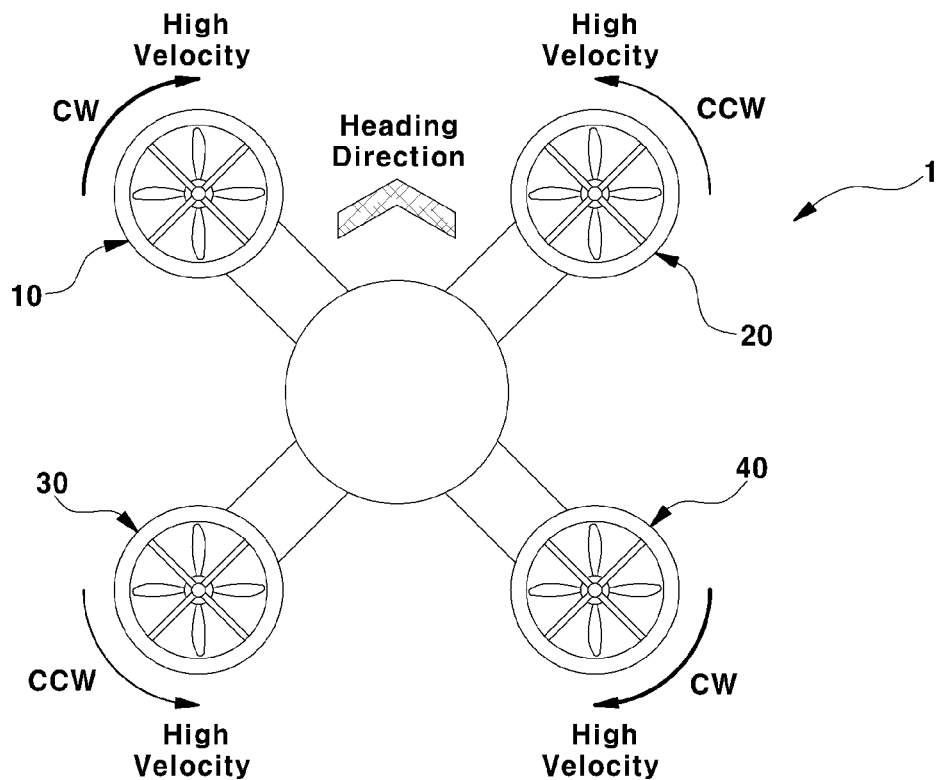
Figure 5:
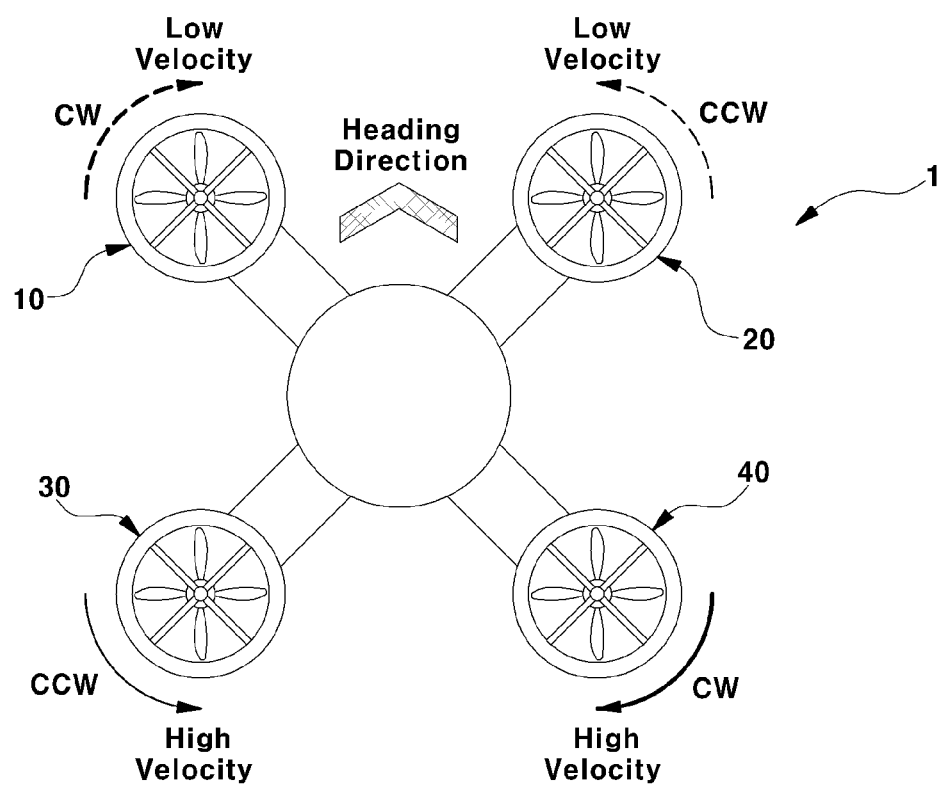

For example, when the vertical take-off and landing air vehicle 1 ascends, the first rotor 10 and the fourth rotor 40 may rotate CW at a high velocity and simultaneously and the second rotor 20 and the third rotor 30 may rotate CCW at a high velocity, as shown in FIG. 4. When the vertical take-off and landing air vehicle 1 moves forward, the first rotor 10 and the second rotor 20 may rotate at a low velocity and simultaneously the third rotor 30 and the fourth rotor 40 may rotate at a high velocity (forward pitching), as shown in FIG. 5.

Figure 6:
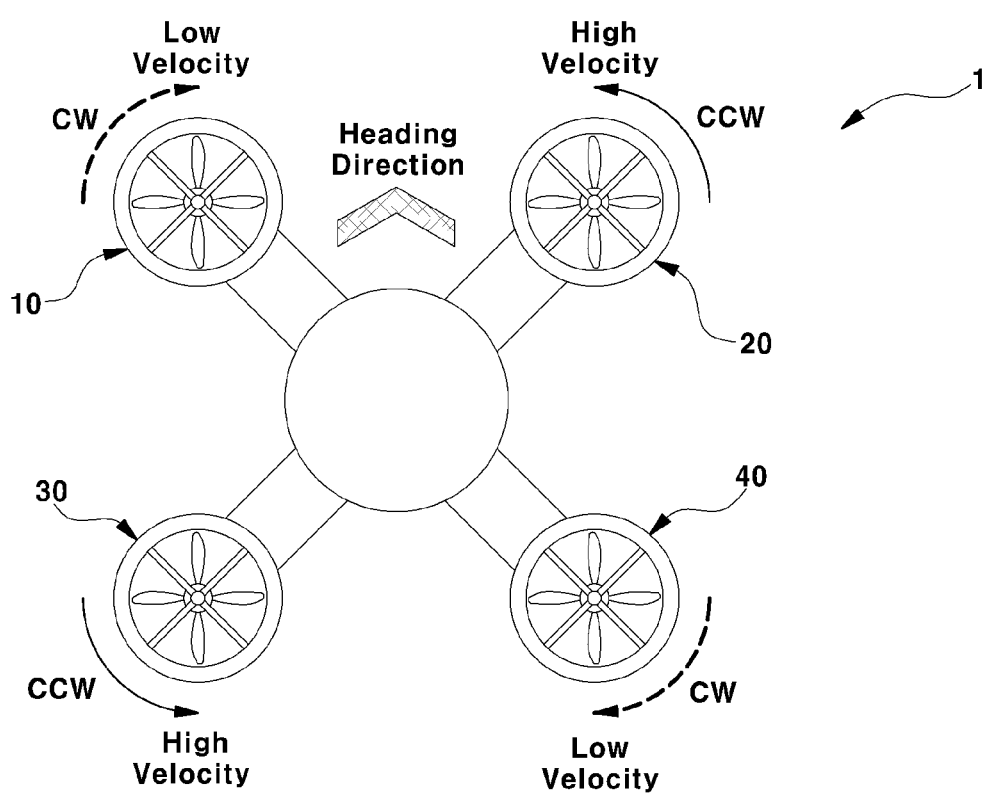
Figure 7:
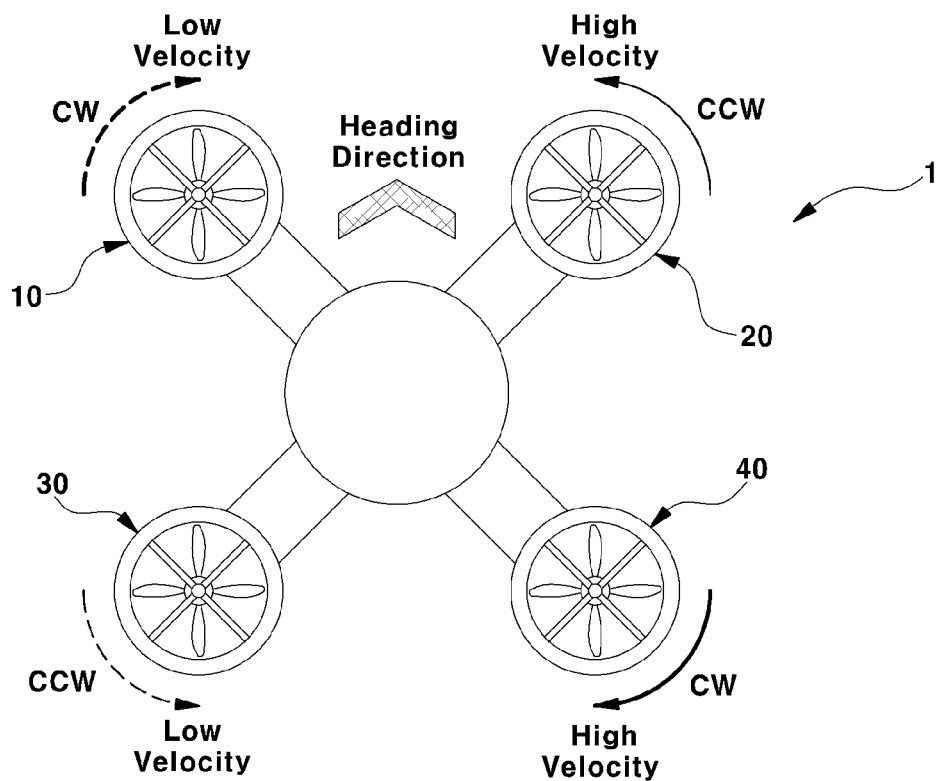

Furthermore, when the vertical take-off and landing air vehicle 1 turns to the right, the first rotor 10 and the fourth rotor 40 may rotate CW at a low velocity and simultaneously the second rotor 20 and the third rotor 30 may rotate CCW at a high velocity (rotor moment asymmetry state), as shown in FIG. 6. When the vertical take-off and landing air vehicle 1 moves to the left, the first rotor 10 and the third rotor 30 may rotate at a low velocity and simultaneously the second rotor 20 and the fourth rotor 40 may rotate at a high velocity (leftward pitching state), as shown in FIG. 7.

In addition, forward and backward acceleration of the vertical take-off and landing air vehicle 1 may be adjusted by forward pitching or backward pitching of a vehicle body (air vehicle) while adjusting the lift of the front rotors (first and second rotors) or the rear rotors (third and fourth rotors). Further, lateral acceleration of the vertical take-off and landing air vehicle 1 may be adjusted by left roll or right roll of the vehicle body while adjusting the lift of the left rotors (first and third rotors) or the right rotors (second and fourth rotors). Additionally, yaw movement (turning movement) of the vertical take-off and landing air vehicle 1 may be adjusting by using vehicle body moment in response to difference between velocities of the rotors that are arranged diagonally.

Figure 2:
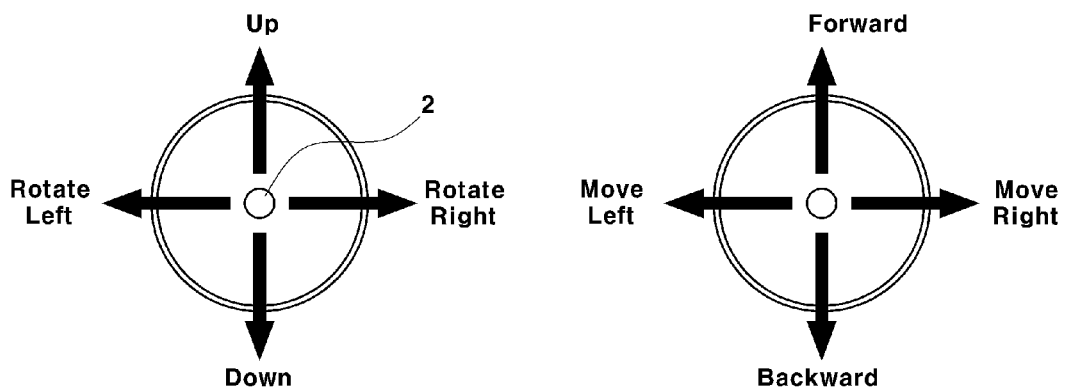
FIG. 2 is a schematic view showing an example of a conventional driving input device for controlling the quadcopter according to the prior art.

Meanwhile, the present disclosure uses the above-described flight and control principle, but the present disclosure is improved in the human-machine interface (hereinafter, which will be referred to HMI) system including a driving input device (control device) that is operated or controlled by the driver for controlling and operating the movement of the air vehicle. In other words, unlike an operation device used in the conventional drone-type air vehicle as shown in FIG. 2, the air vehicle for UAM to which the present disclosure is applied uses the HMI system having a shape and an operation method similar to a driving device of a conventional automobile.

Figure 8:
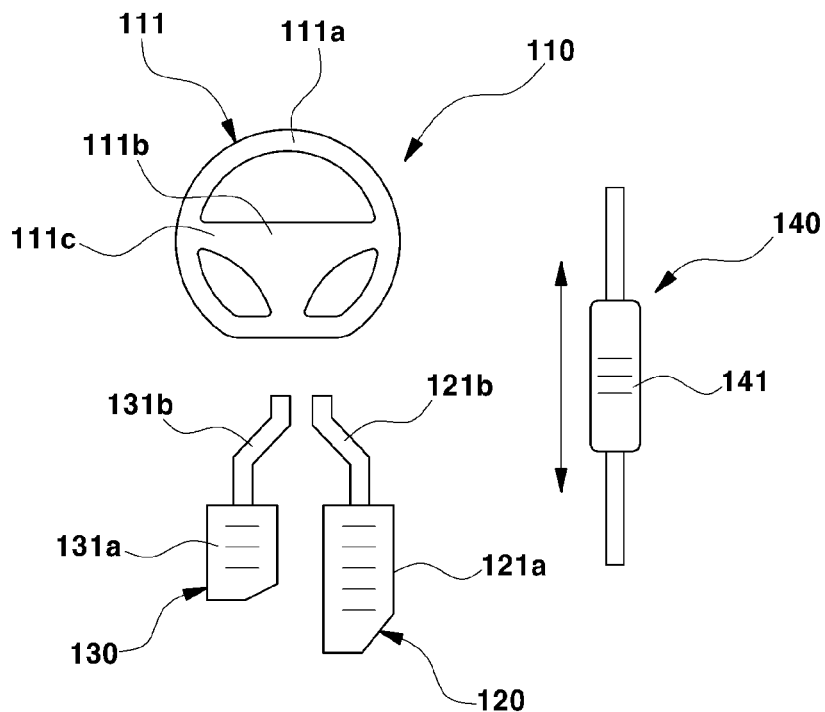
FIG. 8 is a view showing a driving input device in an air vehicle to which a control method according to the present disclosure is applied.
Figure 9:
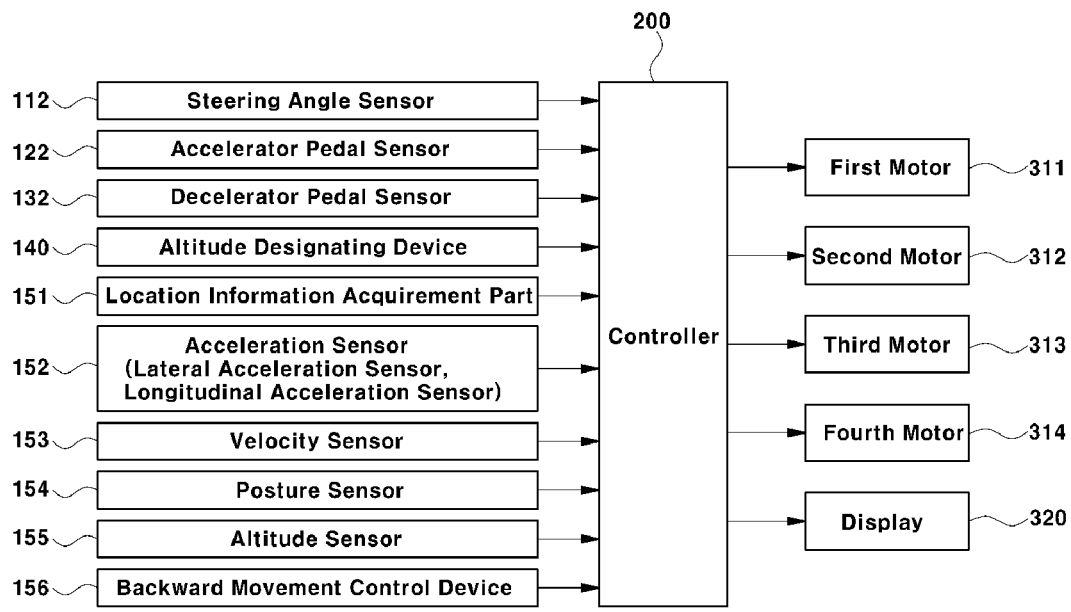
FIG. 9 is a block diagram showing the structure of a control system in the air vehicle to which the control method according to the present disclosure is applied.

FIG. 8 is a view illustrating the driving input device of a control system in the air vehicle in which the control method according to the present disclosure is applied. In other words, this drawing is a front view schematically showing elements of the driving input drive (control device) mounted to a driver seat. FIG. 9 is a block diagram showing the structure of the control system in the air vehicle to which the control method according to the present disclosure is applied.

As shown in the drawings, the driving input device similar to a driving input device of a conventional automobile may be applied to the drive seat (cockpit) in the air vehicle for UAM. In other words, the driving input device of the air vehicle for UAM according to the present disclosure may include a steering wheel assembly 110 provided to be rotated-operated by a hand of the driver (operator), an accelerator pedal 120 and a decelerator pedal 130 provided to be pressed-operated by a foot of the driver, and an altitude designating device 140 provided to be manipulated by a hand of the driver for selecting and designating a flight altitude of the air vehicle. Notably, the present disclosure is not limited to these specific manipulation maneuvers. In addition, the driving input device of the air vehicle for UAM may include a backward movement control device, wherein the backward movement control device (reference numeral 156 in FIG. 9) is provided to be operated for moving the air vehicle backward.

The steering wheel assembly 110 may include a steering shaft (not shown) and a steering wheel 111 having a similar shape to a steering wheel of a conventional automobile, and among the elements, the steering wheel 111 may include a rim portion 111a, a boss portion 111b, and a spoke portion 111c connecting between the rim portion 111a and the boss portion 111b. The steering shaft is coupled to the boss portion 111b to integrally rotate with the steering wheel 111, and the steering shaft is rotatably coupled to the vehicle body of the air vehicle. Whereby, the steering wheel has the structure in which the whole steering wheel is rotatably supported to the vehicle body by the steering shaft.

The steering wheel assembly 110 may include a steering angle sensor 112 configured to detect a rotation angle, i.e. a steering angle of the steering wheel when the driver operates the steering wheel 111. The steering angle sensor 112 of the present disclosure may adopt a sensor same as a steering angle sensor for an automobile provided at a steering shaft of an automobile as the steering angle sensor 112. The steering angle sensor 112 may be configured to output an electrical signal in response to the detected steering angle, and to input the signal to a controller 200. The signal output by the steering angle sensor 112, i.e. a steering angle detection signal representing a steering angle, may be input to the controller 200.

In addition, the accelerator pedal 120 and the decelerator pedal 130 are provided for adjusting longitudinal driving (e.g., acceleration and deceleration) and braking of the air vehicle, and the accelerator pedal 120 is a pedal operated by the driver to accelerate the air vehicle, and the decelerator pedal 130 is a pedal operated by the driver to decelerate and brake the air vehicle. Each of the accelerator pedal 120 and the decelerator pedal 130 of the present disclosure may adopt a pedal having a structure same as an accelerator pedal or a decelerator pedal of the conventional automobile. In other words, each of the accelerator pedal 120 and the decelerator pedal 130 may include a pedal pad 12th, 131a on which the driver steps or engages with his/her foot, a pedal arm 121b, 131b having a first end coupled to the pedal pad to support the pedal pad, and a mounting bracket (not shown) fixed to the vehicle body and to which a second end of the pedal arm is rotatably coupled.

Each of the accelerator pedal 120 and the decelerator pedal 130 may include a sensor configured to output a signal in response to a pedal operation state of the driver. The accelerator pedal 120 may include an accelerator pedal sensor 122 configured to detect an accelerator pedal input value in response to the accelerator pedal operation state as the driver's driving input information, and the decelerator pedal 130 may include a decelerator pedal sensor 132 configured to detect a decelerator pedal input value in response to the decelerator pedal operation state as the driver's driving input information.

The accelerator pedal sensor 122 and the decelerator pedal sensor 132 may be a conventional accelerator pedal sensor (APS) and brake pedal sensor (BPS) that are provided for detecting a pedal position or a pedal depth representing a driver's pedal control amount in the conventional automobile. The accelerator pedal sensor 122 and the decelerator pedal sensor 132 may be configured to input detection signals to the controller 200. In other words, a signal output by the accelerator pedal sensor 122, i.e. a signal representing the accelerator pedal input value, and a signal output by the decelerator pedal sensor 132, i.e. a signal representing the decelerator pedal input value, may be input to the controller 200.

The altitude designating device 140 may be configured to select and designate a driver's desired flight altitude (target altitude) of the air vehicle, and may be formed as a sliding knob-type selector as shown in the drawing. The sliding knob-type selector is proposed as an example, so the present disclosure is not limited to the sliding knob-type altitude designating device, and any method in which the driver may easily select and input the desired flight altitude may be adopted without a limitation. In the sliding knob-type selector shown in the drawing, the driver may select and designate the desired flight altitude by sliding the knob 141 upward and downward. At this point, as a position of the knob 141 may be adjusted by sliding the knob 141 upward and downward, a flight altitude may be changed at a predetermined interval.

The altitude designating device 140 is connected to the controller 200 such that signal input may be performed to the controller 200, and in response to the driver moving and adjusting the knob 141, an electrical signal representing the flight altitude selected by controlling the knob is input to the controller 200, and thus the controller may be configured to detect the altitude value selected and input by the driver.

Meanwhile, the control system of an air vehicle for UAM in which the control method according to the present disclosure is applied may include a location information acquirement part 151. The location information acquirement part 151 may be configured to acquire location information of the air vehicle in real time, and may include a global positioning system (GPS) module. The GPS module communicates with a satellite to acquire the real-time location information where the air vehicle is located, e.g., information about air vehicle's present altitude and longitude.

The control system of an air vehicle for UAM in which the control method according to the present disclosure is applied may include sensors configured to detect driving information required for controlling moving and posture of the air vehicle, such as acceleration and velocity, posture, altitude, etc. of the air vehicle. In particular, the control system may include an acceleration sensor 152 configured to detect acceleration of the air vehicle, a velocity sensor 153 configured to detect a velocity of the air vehicle, a posture sensor 154 configured to detect a posture of the air vehicle, and an altitude sensor 155 configured to detect an altitude of the air vehicle.

The posture sensor 154 may be configured to detect a posture of the air vehicle in 3-dimensional space, and may include 3-axis magnetic field sensor or 3-axis gyroscope sensor. The altitude sensor may be a sensor configured to measure an altitude by using a radar or measuring an altitude by using atmospheric pressure measured by a barometer. The sensors may be selectively used to detect rotary acceleration of the air vehicle.

In addition, the HMI system may include known sensors, detection factors, and information acquirement part for acquiring information required for flight of the air vehicle, and for example, may include a distance measurement sensor. The distance measurement sensor may be configured to measure a distance to a surrounding outside object, and ultrasound, infrared, or radar may be used for distance measurement.

According to the present disclosure, the controller 200 may be configured to execute the operation of a drive device for driving the air vehicle, based on a variety of the driving information acquired and collected by a driving information detection part, such as the sensors and the information acquirement part, in the air vehicle. The drive device may include motors 311 to 314 rotating the rotors. For example, the drive device of the quad copter having 4 rotors may include 4 motors 311 to 314 rotating the 4 rotors.

Furthermore, the control system in which the control method of the present disclosure is applied may include a display 320 for supporting driving and control of the driver, and the operation of the display 320 may be executed by the controller 200. The display 320 may be an augmented reality-head up display (AR-HUD) provided in the air vehicle.

Figure 10:
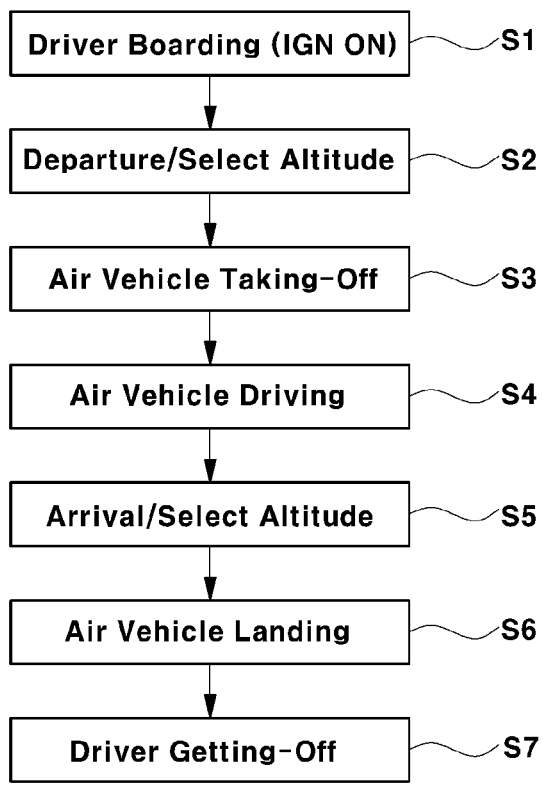
FIG. 10 is a flowchart showing an operation process of an air vehicle for UAM according to the present disclosure.

Meanwhile, FIG. 10 is a flowchart showing an operation process of the air vehicle for UAM according to the present disclosure, and the description thereof is as follows. According to the present disclosure, after the driver boards the air vehicle and turns the power on (IGN ON) (S1), the driver may select and designate the desired flight altitude (e.g., 150 m) by using the altitude designating device 140 and start the air vehicle (S2), whereby the air vehicle takes off and automatically vertical-ascends to the target altitude selected by the driver (S3), and then the air vehicle does not change the altitude thereof during the flight.

As described above, before the departure of the air vehicle, the driver may select and designate the flight altitude in advance by using the altitude designating device 140, and the selecting and designating the flight altitude by using the altitude designating device 140 may be limited to be performed by the driver only before the departure of the air vehicle. In other words, during flight, it may be possible to prevent the driver from further operating the altitude designating device. Of course, the flight altitude may be selected and designated right after the departure, or when necessary, the flight altitude may be changed using the altitude designating device 140 after the departure.

Furthermore, after the departure, when the air vehicle automatically vertical ascends until reaching the target altitude selected by the driver, a hovering control may be automatically performed until there is a separate input from the driver, and altitude of the air vehicle may be maintained. Then, the driver may move the air vehicle at the desired direction and a velocity by operating the steering wheel 111, the accelerator pedal 120, and the decelerator pedal 130, and during the driving, an altitude of the air vehicle is continuously maintained at the altitude selected by the driver (S4).

As described above, in a state where the altitude is automatically maintained after vertical ascending of the air vehicle, the driver may operate or drive the air vehicle at the desired direction and velocity by controlling only the steering wheel 111, the accelerator pedal 120, and the decelerator pedal 130, and at this point, motion of the air vehicle is limited in plane movement within the altitude selected by the driver. In the state where the altitude of the air vehicle is automatically maintained, the driver performs the plane movement of the air vehicle to the target location by operating only the steering wheel and pedals.

After the air vehicle arrives at the target location, the driver may operate the altitude designating device 140 to select and designate an altitude where a take-off and landing field is located (S5), whereby the air vehicle lands by automatically vertical-descending to the landing field located at the selected altitude (S6). Then, the driver may turn the power of the air vehicle off (IGN OFF) and exit the air vehicle (S7). As described above, according to the present disclosure, when the driver designates the target altitude by using the altitude designating device, the air vehicle vertically ascends to the target altitude of the air vehicle, and vertical ascending of the air vehicle is automatically performed as the controller 200 operates the motors 311 to 314 that are the drive device.

Additionally, when the air vehicle has vertically ascended to the target altitude, the driver may move the air vehicle to the desired direction and velocity by operating the steering wheel 111, the accelerator pedal 120, and the decelerator pedal 130, and during driving, the controller 200 may be configured to operate each of the motors 311 to 314 that are the drive device based on the driving information acquired as the driver operates the steering wheel 111, the accelerator pedal 120, and the decelerator pedal 130. In addition, the controller 200 allows turning for steering the air vehicle or only minimal roll, pitch, yaw movements required for acceleration, and deceleration of the air vehicle at the target altitude, and the controller 200 moves the air vehicle on a plane. As described above, the air vehicle for the UAM may fly freely in 3-dimensional space, but moves similarly to driving and moving characteristics of the conventional automobile, excluding altitude change or transverse movement.

In other words, in the present disclosure, similar to driving the conventional automobile, the driver operates the steering wheel 111 to perform the steering to control and change a heading direction of the air vehicle to a desired direction, and the driver operates the accelerator pedal 120 to accelerate the air vehicle or operates the decelerator pedal 130 to decelerate or brake the air vehicle. When a velocity of the air vehicle remains at 0 while the driver engages the decelerator pedal, the air vehicle may be controlled to maintain the driver selection altitude and perform the hovering movement.

Therefore, in the present disclosure, after increasing the altitude of the air vehicle, the air vehicle may move to the target location by the planar movement, such as forward movement, left turn, right turn, acceleration, and deceleration, etc., so that the driver and passengers may feel more comfortable in the air vehicle without various discomfort such as motion sickness and dizziness that may be felt in the conventional automobile.

The driving control of the air vehicle of the present disclosure is similar to the driving control of the conventional automobile. In other words, the driver may move at the desired direction and velocity by operating the steering wheel 111, the accelerator pedal 120, and the decelerator pedal 130, so that the driving control is more similar to the familiar conventional automobile and people may easily operate the air vehicle without specialized training.

Meanwhile, according to the present disclosure, virtual layers of planes per altitude selected by the altitude designating device 140 within the 3-dimensional space is defined in advance, and in detail, a virtual spatial road layer (VSRL) in which a virtual road (airway) is set within the virtual layers of planes per altitude may be defined, and input and stored in the controller.

Figure 11:
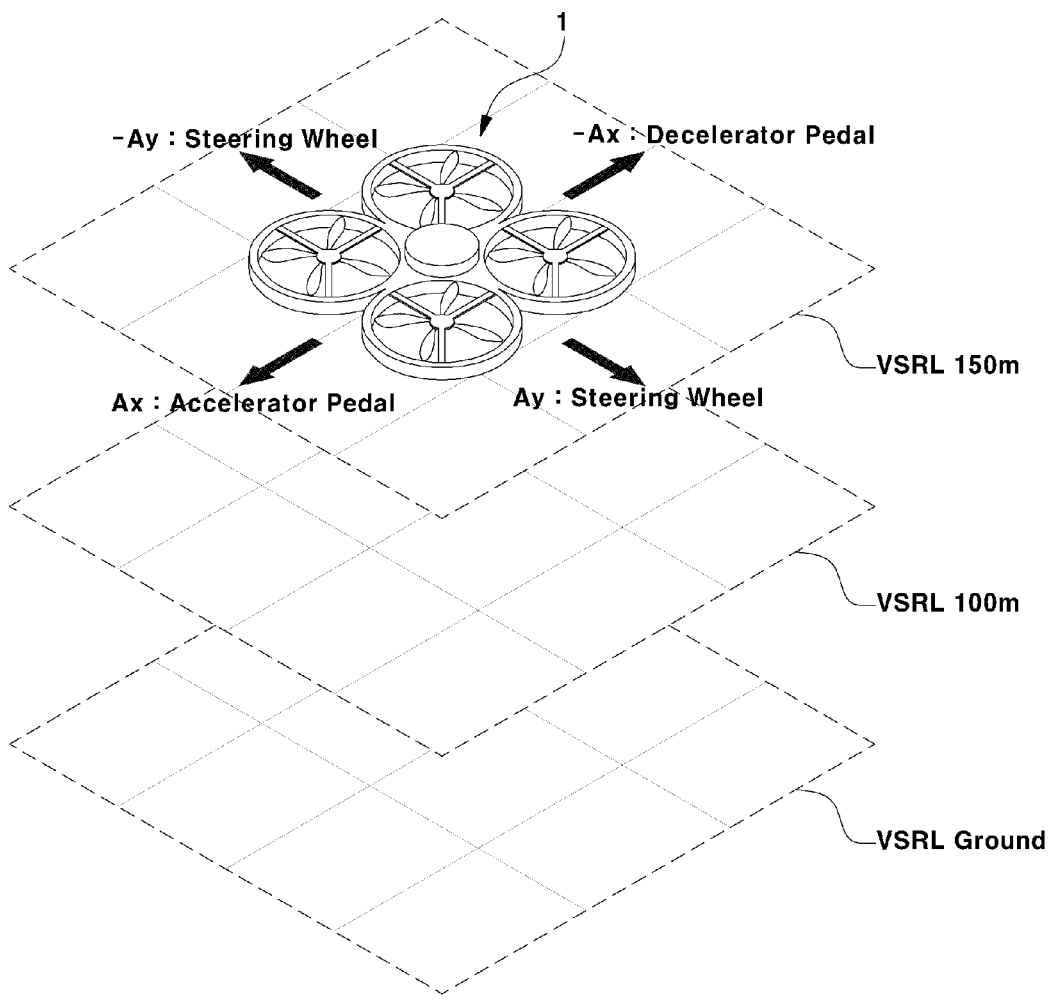
FIG. 11 is a view showing an example of virtual spatial road layers of planes per altitude according to the present disclosure.

FIG. 11 is a view showing an example of the VSRL of planes per altitude according to the present disclosure, and the VSRL of planes per altitude includes a straight line representing a road and an intersection of straight lines representing an intersection of roads. While the VSRL of planes per altitude (e.g., ground, 100 m, 150 m) is input and stored in the controller 200 in advance as shown in FIG. 11, the driver may designate the desired flight altitude by using the altitude designating device 140, whereby a plane of the VSRL corresponding to the designated altitude is selected from the controller 200.

When after the departure, the air vehicle 1 automatically and vertically ascends and reaches the flight altitude selected by the driver, the controller 200 may be configured to operate the display 320 in the air vehicle 1 to display an image of the VSRL including the virtual plane road at the selected altitude. At this point, the controller 200 indicates a present location and a moving path of the air vehicle in the VSRL based on the real-time location information of the air vehicle 1 acquired through the location information acquirement part 151. Therefore, while the driver operates the steering wheel 111, the accelerator pedal 120, and the decelerator pedal 130 and moves the air vehicle 1 at a specific altitude, the controller 200 may be configured to perform drive assistant and drive support for continuously guiding the flight path to the driver of the air vehicle so that the air vehicle does not deviate from the road in the VSRL and moves along the road.

A virtual traffic light system may be applied to the present disclosure, when the drive assist and support is performed to guide the flight path to the driver by displaying the VSRL of the selected altitude and the location of the air vehicle 1 on the display 320 and allowing the air vehicle to move along the load in the VSRL. In other words, a virtual traffic light is marked at each intersection in the VSRL on the display.

When multiple air vehicles flying at the same altitude pass through a specific intersection in the VSRL displayed on the display at the same time, the virtual traffic light system may be configured to provide a notification to the driver of a point of passing the intersection corresponding to each air vehicle through the virtual traffic light, so that the air vehicles may pass through the intersection at respective designated point and order without a collision accident.

The virtual traffic light system is applied on the intersection in the VSRL by simulating the actual traffic light system that is provided on the ground intersection and operated for the conventional automobile. In other words, as pass and stop signals are provided successively to a driver for each air vehicle through the virtual traffic light displayed on the intersection in the VSRL, each air vehicle may be guided to pass through the intersection at the designated point successively.

Controllers of the air vehicles flying toward the intersection share location information thereof with each other. In addition, the controllers may be configured to communicate with each other and determine a traffic priority of passing the intersection for all air vehicles based on the location information of the air vehicles, and share the determined traffic priority with each other through the communication. The controller of each air vehicle may be configured to provide a notification to the driver of the pass and stop signals by displaying the signals through the virtual traffic light, so that the air vehicle may pass through the intersection at the designated point without a collision.

In the embodiment of the present disclosure, the traffic priority of the intersection may be determined based on a distance from the intersection to each air vehicle. The traffic priority may be determined such that an air vehicle located closer to the intersection is guided to pass through the intersection earlier.

Figure 12:
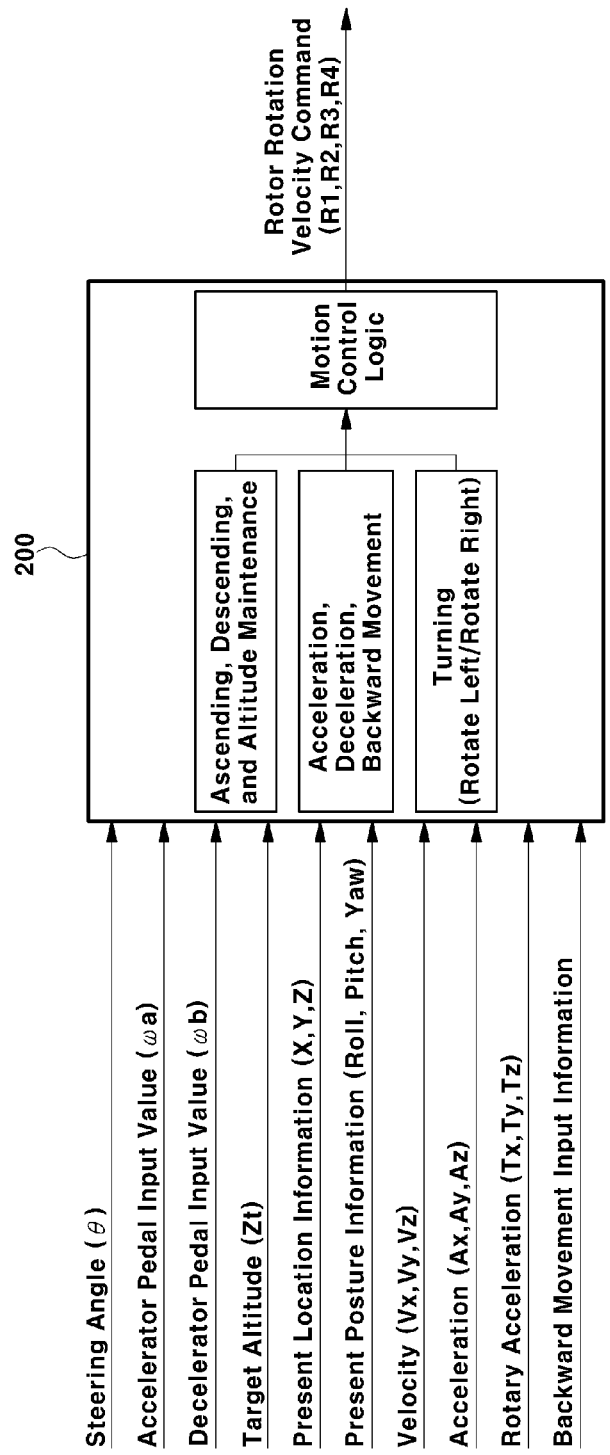
FIG. 12 a control block diagram of the air vehicle for UAM according to an embodiment of the present disclosure.

Hereinbelow, a control method of the air vehicle according to an embodiment of the present disclosure will be described in detail with reference to accompanying drawings. FIG. 12 is a view showing the control method of the air vehicle for the UAM according to the embodiment of the present disclosure, and a control block diagram for performing a motion control of the air vehicle based on real-time driving information collected from the air vehicle during the flight. In the air vehicle to which the control method of the present disclosure is applied, the drive device may include a plurality of motors that are separately provided to rotors for rotating the rotors, and the drive device in the quadcopter is the 4 motors.

Figure 13:
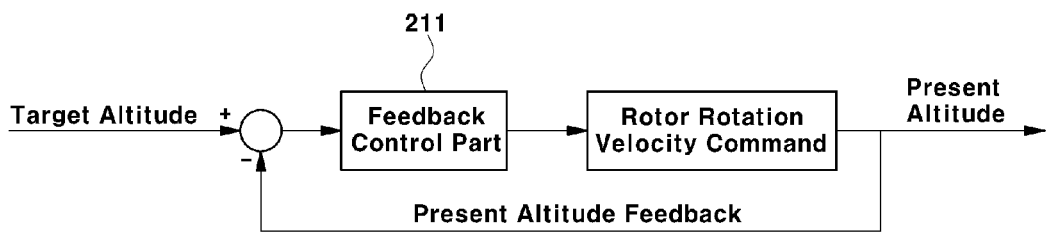
FIG. 13 is a view showing an algorithm of control logic for ascending and descending, and maintaining altitude of the air vehicle according to the embodiment of the present disclosure.

As shown in FIG. 13, the real-time driving information may be collected from the air vehicle, and the real-time driving information is input to the controller 200. At this point, the real-time driving information may include: a steering angle ($\theta$) detected by the steering angle sensor 112, an accelerator pedal input value ($\omega_a$) detected by the accelerator pedal sensor 122, a decelerator pedal input value ($\omega_b$) detected by the decelerator pedal sensor 132, a target altitude value (Zt) in response to the operation of the altitude designating device 140, real-time air vehicle altitude information (Z) detected by the altitude sensor 155, real-time air vehicle location information (X, Y) acquired by the location information acquirement part 151, real-time air vehicle posture information (roll, pitch, yaw value) detected by the posture sensor 154, an air vehicle velocity (Vx, Vy, Vz) detected by the velocity sensor 153, and air vehicle acceleration (Ax, Ay, Ax) and air vehicle rotary acceleration (Tx, Ty, Tz) detected by the acceleration sensor 152. In addition, the real-time driving information may include backward movement input information that is input as the driver operates a backward movement control device 156.

Accordingly, the controller 200 may be configured to perform the control for ascending, descending, and altitude maintaining of the air vehicle in response to the control logic preset based on the driving information input as described above, perform the control for acceleration, deceleration, and backward movement, and perform the turning (steering) control for left turn and right turn.

For performing the controls, the control logic of the controller 200 may be configured to generate a control command (R1, R2, R3, R4) value for each of the rotors based on the driving information, and at this point, the controller 200 may be configured to operate each of the motors 311 to 314 in response to the generated control command value. A control command (R1, R2, R3, R4) for controlling the drive of each of the motors 311 to 314 may be a rotation velocity command, and the rotor rotation velocity command (R1, R2, R3, R4) refers to a motor rotation velocity command in FIG. 12 and the motor rotation velocity command becomes a control command value for controlling motor drive.

In the electric drone such as the quadcopter capable of being used as the air vehicle for UAM, the drive device for flight is the motors rotating the rotors, so the controller controls the drive of each of the motors rotating the rotors in response to the control command value. An inverter may be used for the drive and control of the motors.

FIG. 13 is a view showing an algorithm of control logic for ascending and descending, and maintaining altitude of the air vehicle according to the embodiment of the present disclosure, and illustrates a state of performing a rotor rotation velocity feedback control by which the air vehicle ascends and descends to, and maintains at the target altitude (Zt).

When the driver operates the altitude designating device 140 to select and designate the flight altitude to be desired (hereinbelow, which is referred to 'target altitude'), the controller 200 may be configured to perform the feedback control for adjusting the altitude of the air vehicle to the target altitude by using a value of the target altitude (Zt) and real-time air vehicle altitude (Z) information detected by the altitude sensor 155.

The real-time air vehicle altitude (Z) value detected by the altitude sensor 155 becomes a feedback input value, and a feedback control part 211 in the controller 200 performs the feedback control by using the target altitude (Zt) and information about the present altitude (Z) value that is the feedback input value. At this point, the feedback control part 211 may be configured to generate and output a control command value for maintaining an air vehicle altitude value to the target altitude, i.e. generate and output a rotor (motor) rotation velocity command (R1, R2, R3, R4).

As described above, as the driving of the rotors (motors) is controlled in response to the control command value generated by the feedback control part 211, the air vehicle may maintain the target altitude, and the ascending and descending control of the air vehicle may be performed so that the present altitude follows the target altitude. A controller, such as PID (proportional-integral-differential), lead-lad, Kalman filter, etc., may be used as the feedback control part 211 depending on characteristics of the system.

Figure 14:
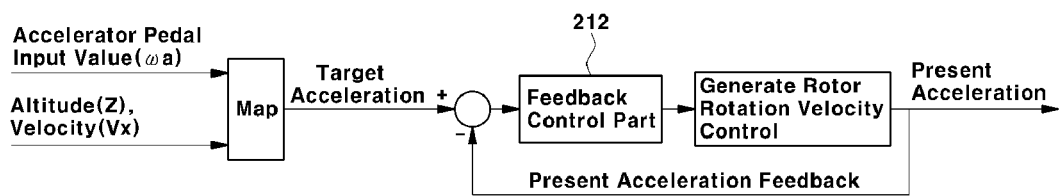
FIGS. 14 and 15 are views showing an algorithm of control logic for acceleration and deceleration of the air vehicle in the embodiment of the present disclosure.
Figure 15:
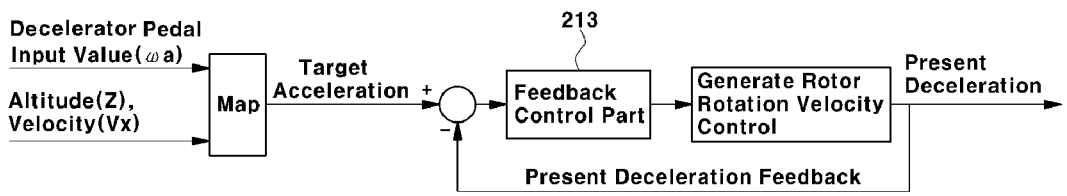

FIGS. 14 and 15 are views showing an algorithm of control logic for acceleration and deceleration of the air vehicle according to the embodiment of the present disclosure. FIG. 14 illustrates a state of performing the acceleration control of the air vehicle in response to the accelerator pedal input value ($\omega_a$), and FIG. 15 illustrates a state of performing the deceleration control of the air vehicle in response to the decelerator pedal input value ($\omega_b$).

As shown in FIG. 14, during the acceleration control, the controller 200 may be configured to determine target acceleration by using the driving information collected from the air vehicle, i.e. by using the accelerator pedal input value ($\omega_a$), and the present altitude (Z) and velocity (Vx) information of the air vehicle as the input information. At this point, the controller 200 may be configured to receive and store setting data used to determine the target acceleration from the input information in advance.

The setting data is data defining correlation between the input information (accelerator pedal input value, altitude and velocity of air vehicle) and the target acceleration, and may be a map in which the target acceleration is set as a value corresponding to the accelerator pedal input value ($\omega_a$) and the altitude (Z) and the velocity (Vx) of the air vehicle. The controller 200 may be configured to determine the target acceleration corresponding to a present accelerator pedal input value ($\omega_a$) and the present air vehicle altitude (Z) and the velocity (Vx) by using the map.

A feedback control part 212 of the controller 200 uses the target acceleration determined above as a target value and uses present air vehicle longitudinal acceleration (Ax) detected by the acceleration sensor 152 (longitudinal acceleration sensor) as a feedback value to generate and output the control command (R1, R2, R3, R4) for allowing longitudinal acceleration of the air vehicle to follow the target acceleration.

As shown in FIG. 15, during the deceleration control, the controller 200 may be configured to determine target deceleration using the driving information collected from the air vehicle, i.e. a decelerator pedal input value ($\omega_b$), and a present air vehicle altitude (Z) and velocity (Vx) information as the input information. At this point, the controller 200 may be configured to receive and store setting data used to determine the target deceleration from the input information in advance.

The setting data defines correlation between the input information (decelerator pedal input value, altitude and velocity of air vehicle) and the target deceleration, and may be a map in which the target deceleration is set as a value corresponding to the decelerator pedal input value ($\omega_b$) and the altitude (Z) and the velocity (Vx) of the air vehicle. Whereby, the controller 200 may be configured to determine the target deceleration corresponding to the present decelerator pedal input value ($\omega_b$) and a present air vehicle altitude (Z) and velocity (Vx) by using the map.

A feedback control part 213 of the controller 200 uses the target deceleration determined above as a target value and uses air vehicle longitudinal deceleration (Ax) detected by the acceleration sensor 152 (longitudinal acceleration sensor) as a feedback value to generate and output a control command (R1, R2, R3, R4) for allowing longitudinal deceleration of the air vehicle to follow the target deceleration.

Therefore, during the acceleration and deceleration control, in response to the control command (R1, R2, R3, R4) value generated and output from the feedback control part 212, 213, i.e. a rotor (motor) rotation velocity command value, drive of each of the motors 311 to 314 that are the drive device of the air vehicle is controlled, thereby air vehicle's acceleration or deceleration flight corresponding to the driver's pedal input value ($\omega_a$, $\omega_b$) may be performed.

Figure 16A:
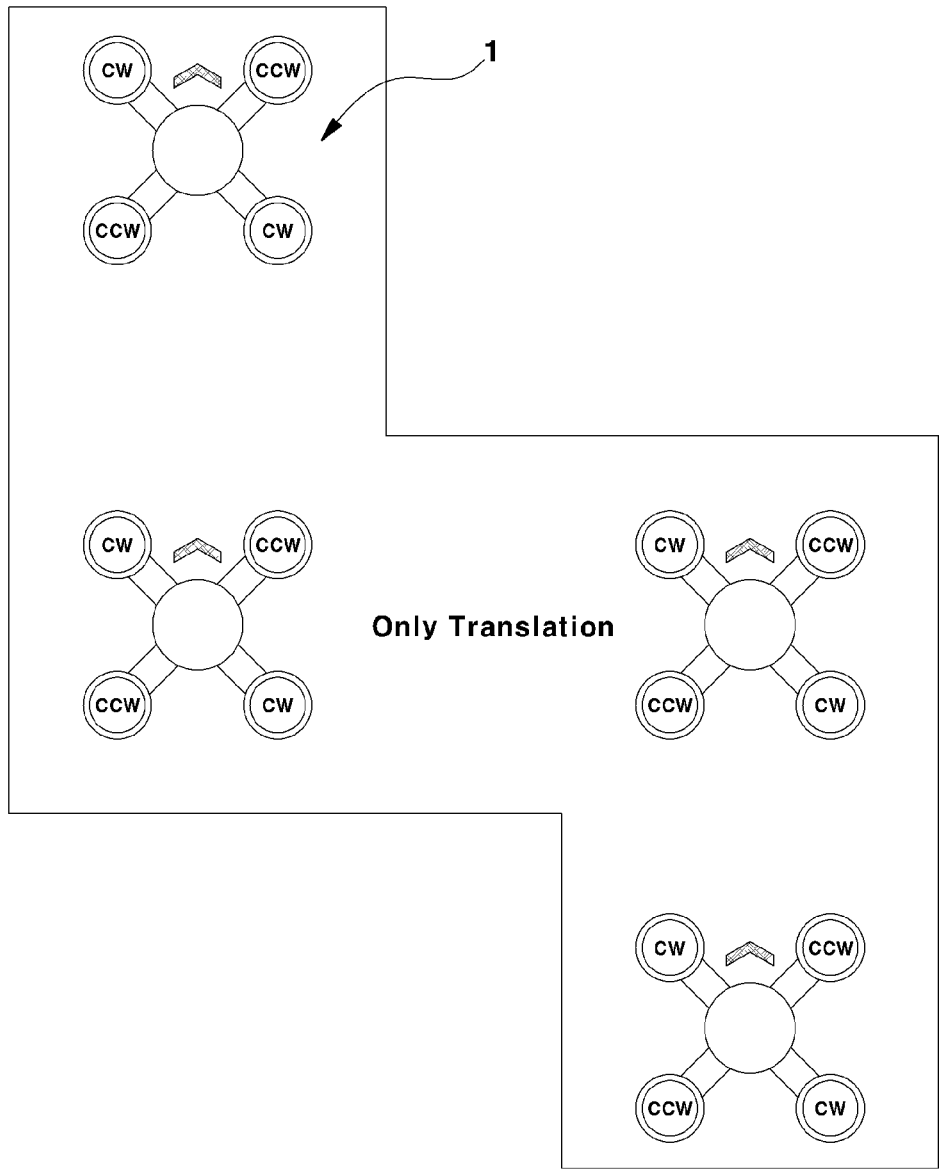
FIGS. 16A, 16B, and 16C are views showing comparison between a turning method of the conventional drone and a turning method of the air vehicle for UAM according to the present disclosure.
Figure 16B:
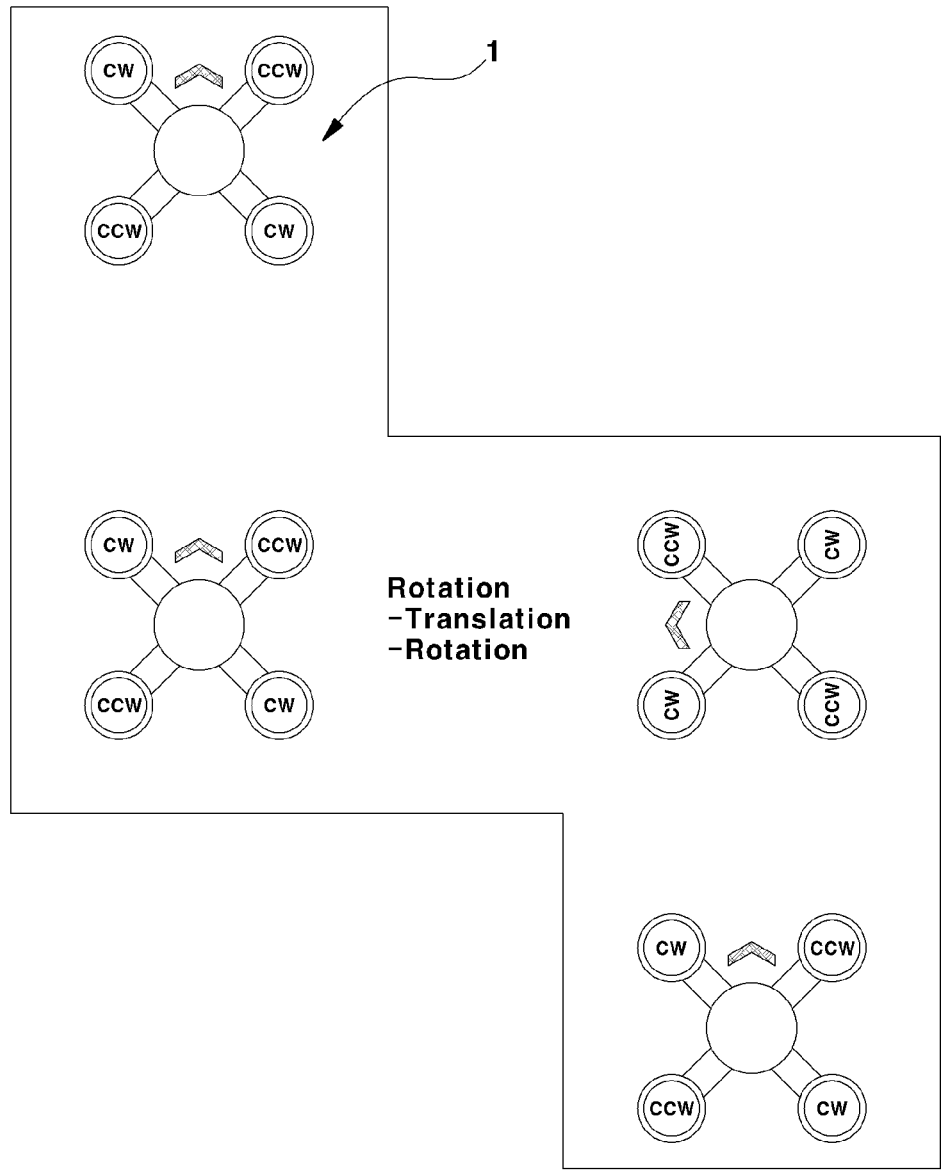
Figure 16C:
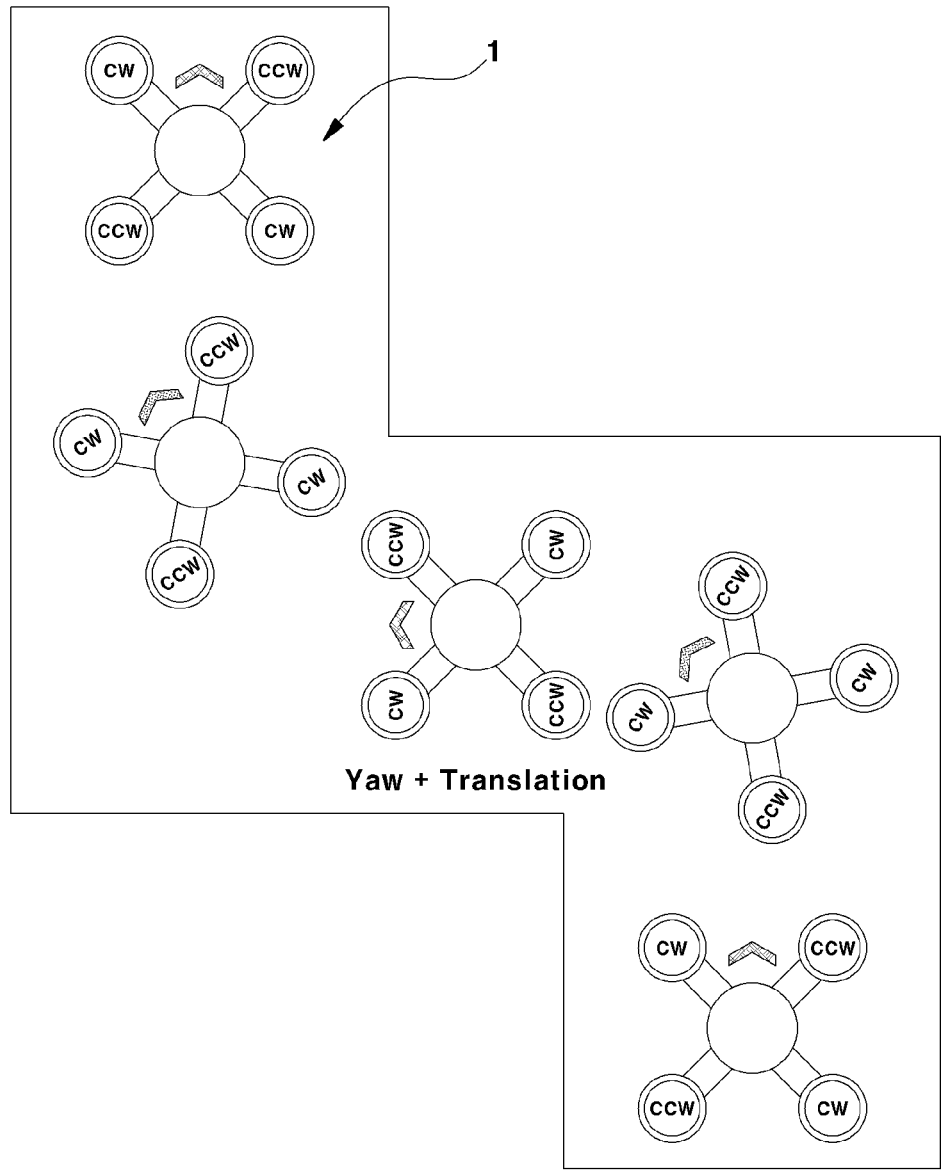

Next, FIGS. 16A, 16B, and 16C are views showing comparison between a turning method of the conventional drone and a tuning method of the air vehicle for UAM according to the present disclosure, wherein FIGS. 16A and 16B show turning states of the conventional drone and FIG. 16C shows a turning state of the air vehicle for UAM according to the present disclosure.

An only translation method as shown in FIG. 16A or a translation+rotation combination method as shown in FIG. 16B are used as the turning method of the conventional drone. However, with the turning method of the conventional drone, the purpose of movement may be achieved, but the passengers can feel discomfort such as motion sickness and dizziness due to the motion of an unfamiliar air vehicle.

On the other hand, the present disclosure is configured such that the turning motion and movement of the air vehicle are performed in a manner similar to a way of controlling a steering wheel in the conventional automobile. In other words, to complement the shortcomings of the motion of the conventional drone and to improve control performance and ease of control, a form of the steering device of the conventional automobile familiar to the driver is adopted as the main HAM, and the air vehicle may perform the tuning movement in a similar form to a tuning form in the conventional automobile by the steering input method similar to the conventional automobile.

As shown in FIG. 16C, the air vehicle of the present disclosure performs the turning driving while simultaneously performing the yaw movement and forward movement like driving the conventional automobile (simultaneous translation and rotation). When the driver controls the steering wheel 111 while looking forward from the driver seat, the air vehicle 1 moves forward with the yaw movement in a direction where the driver performs the steering of the air vehicle with the control of the steering wheel and performs the turning flight such that the air vehicle alternately performs a left turn and a right turn and simultaneously moves forward like the conventional automobile passing through a narrow alley.

Figure 17:
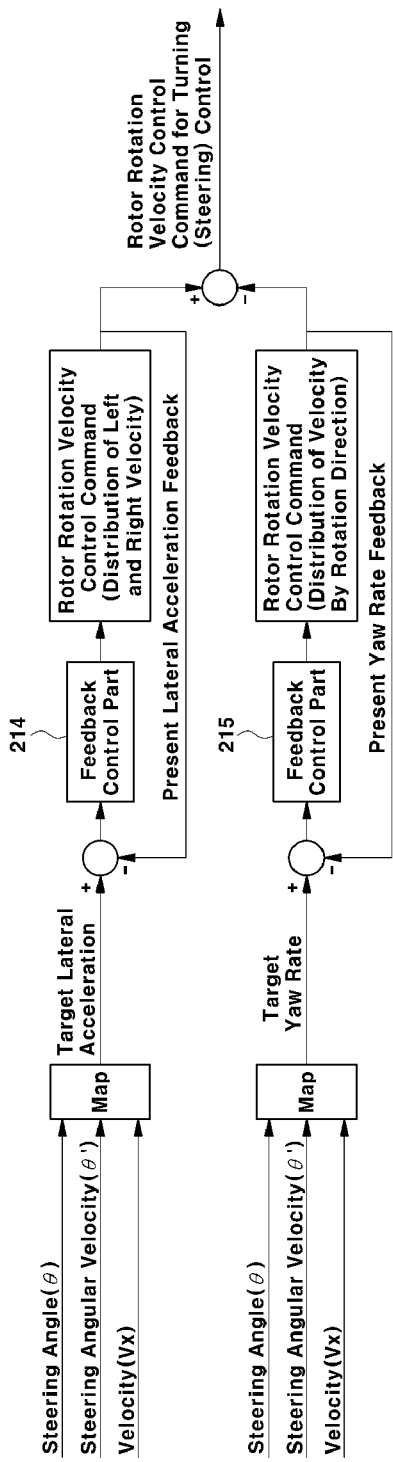
FIG. 17 is a view showing an algorithm of control logic for turning the air vehicle according to the embodiment of the present disclosure.

FIG. 17 is a view showing an algorithm of control logic for the turning flight according to the embodiment of the present disclosure, and is a control block diagram showing the steering control (turning control) for the air vehicle with a steering angle ($\theta$), a steering angular velocity ($\theta'$), and an air vehicle velocity (Vx) as an input.

During the turning control as shown in FIG. 16C, as the driving information collected from the air vehicle 1, the controller 200 may be configured to receive the steering input information in response to the driver's steering wheel control, i.e. the real-time steering angle ($\theta$) information detected by the steering angle sensor 112 and simultaneously receive the real-time air vehicle velocity (Vx) information detected by the velocity sensor 153. The controller 200 may use the steering angular velocity ($\theta'$) information obtained by differentiating a steering angle signal as the steering input information.

At this point, the controller may be configured to determine the target lateral acceleration and the target yaw rate value from the information about steering angle ($\theta$), steering angular velocity ($\theta'$), and air vehicle velocity (Vx) by using the setting data. The setting data may include a first map in which the target lateral acceleration is set as a value corresponding to steering angle, steering angular velocity, and air vehicle velocity and a second map in which the target yaw rate is set as a value corresponding to steering angle, steering angular velocity, and air vehicle velocity. Whereby, with inputting the steering angle, steering angular velocity, and air vehicle velocity, the target lateral acceleration may be determined from the first map of the controller and the target yaw rate may be determined from the second map thereof.

The feedback control parts 214 and 215 of the controller 200 use the target lateral acceleration and target yaw rate determined above as a respective target value, and use air vehicle lateral acceleration (Ay) detected by the acceleration sensor 152 (lateral acceleration sensor) and a yaw rate value detected by the posture sensor 154 as a feedback value, to generate and output the control command (R1, R2, R3, R4) value for allowing the lateral acceleration and yaw rate of the air vehicle to respectively follow the target lateral acceleration and the target yaw rate.

A final control command (R1, R2, R3, R4) value for the steering control is generated by the controller 200, based on the control command value output by the feedback control part 214 performing the feedback control to the air vehicle lateral acceleration and the control command value output by the feedback control part 215 performing the feedback control to the air vehicle yaw rate.

Therefore, during the turning and steering control of the air vehicle 1, in response to the final control command (R1, R2, R3, R4) value generated and output by the controller, i.e., the rotor (motor) rotation velocity command value, the driver of each of the motors 311 to 314 that are the drive device of the air vehicle is controlled, so that performing the turning and steering of the air vehicle corresponding to the driver's steering input value may be performed.

Although the exemplary embodiment of the present invention has been described for illustrative purposes, those skilled in the art will appreciate that various modifications, additions and substitutions are possible, without departing from the scope and spirit of the present invention as disclosed in the accompanying claims.

What is claimed is:

1. A control method of an air vehicle for urban air mobility, the air vehicle including a driving input device comprising a steering wheel, an accelerator pedal, a decelerator pedal, and an altitude designating device, the control method comprising:
   acquiring, by a controller, air vehicle driving information including driving input information in response to operation of the driving input device;
   adjusting byte controller, an altitude of the air vehicle to a target altitude on the basis of a target altitude value in response to an operation state of the altitude designating device among the acquired air vehicle driving information;
   adjusting, by the controller, longitudinal acceleration and longitudinal deceleration of the air vehicle in response to operation states of the accelerator pedal and the decelerator pedal among the acquired air vehicle driving information; and
   adjusting, by the controller, steering during flight of the air vehicle in response to an operation state of the steering wheel among the acquired air vehicle driving information;
   wherein, in the adjusting of the longitudinal acceleration and the longitudinal deceleration of the air vehicle and the adjusting of the steering during moving of the air vehicle, the controller is configured to perform control for maintaining the altitude of the air vehicle to the target altitude designated by the operation of the altitude designating device;
   wherein the controller is configured to perform control allowing the air vehicle to vertically ascend until reaching the target altitude designated by the operation of the altitude designating device during taking-off of the air vehicle; and
   wherein the controlling the longitudinal acceleration of the air vehicle includes:
      determining, by the controller, target acceleration based on an accelerator pedal input value, among the air vehicle driving information, detected by an accelerator pedal sensor;
      determining, by the controller, a control command for feedback-controlling to allow the air vehicle longitudinal acceleration, among the air vehicle driving information, detected by an acceleration sensor to follow the target acceleration, and
      operating, by the controller, the drive device of the air vehicle in response to the determined control command.

2. The control method of claim 1, wherein, in the adjusting of the altitude of the air vehicle, the controller is configured to perform control for a drive device of the air vehicle by using an air vehicle altitude value, among the air vehicle driving information, detected by an altitude sensor as feedback information so that the altitude of the air vehicle follows the target altitude.

3. The control method of claim 1, further comprising:
   displaying, by the controller, a virtual spatial road layer corresponding to the target altitude on a display of the air vehicle, and simultaneously, displaying an air vehicle present location, among the air vehicle driving information, acquired by a location information acquirement part on the virtual spatial road layer.

4. The control method of claim 3, wherein the controller is configured to select a virtual spatial road layer corresponding to the target altitude designated by the operation of the altitude designating device from virtual spatial road layers per altitude input and stored in advance and to display the selected virtual spatial road layer on the display.

5. The control method of claim 4, wherein the virtual spatial road layer is configured such that roads are preset in a virtual layer of a plane per altitude, and straight lines represent the roads and an intersection of the straight lines represents an intersection of the roads in the virtual spatial road layer displayed on the display.

6. The control method of claim 1, wherein, in the determining of the target acceleration, the controller is configured to determine the target acceleration from a map, the target acceleration corresponding to the accelerator pedal input value, the air vehicle altitude detected by the altitude sensor, and an air vehicle velocity detected by a velocity sensor, among the air vehicle driving information.

7. The control method of claim 1, wherein the adjusting of the longitudinal deceleration of the air vehicle includes:
   determining, by the controller, target deceleration based on a decelerator pedal input value, among the air vehicle driving information, detected by a decelerator pedal sensor;
   determining, by the controller, a control command for feedback-controlling to allow the air vehicle longitudinal deceleration, among the air vehicle driving information, detected by the acceleration sensor to follow the target deceleration; and
   operating, by the controller, the drive device of the air vehicle in response to the determined control command.

8. The control method of claim 7, wherein, in the determining of the target deceleration, the controller is configured to determine the target deceleration from a map, the target deceleration corresponding to the decelerator pedal input value, the air vehicle altitude detected by the altitude sensor, and an air vehicle velocity detected by a velocity sensor, among the air vehicle driving information.

9. The control method of claim 1, wherein the adjusting of the steering during flight of the air vehicle includes:
   determining, by the controller, target lateral acceleration and a target yaw rate based on steering input information, among the air vehicle driving information, in response to the operation state of the steering wheel;
   determining, by the controller, a control command for feedback-controlling to allow air vehicle lateral acceleration, among the air vehicle driving information, detected by an acceleration sensor to follow the target lateral acceleration;

determining, by the controller, a control command for feedback-controlling an air vehicle yaw rate, among the air vehicle driving information, detected by a posture detection sensor to follow the target yaw rate; and operating, by the controller, the drive device of the air vehicle based on the control command for following the target lateral acceleration and the control command for following the target yaw rate.

10. The control method of claim 9, wherein the steering input information includes a steering angle and a steering angular velocity acquired from a signal of a steering angle sensor, and in the determining the target lateral acceleration and the target yaw rate, the controller is configured to determine the target lateral acceleration and the target yaw rate from respective maps, the target lateral acceleration and the target yaw rate corresponding to the steering angle and steering angular velocity, and air vehicle velocity detected by a velocity sensor among the air vehicle driving information.

* * * * *